United States Patent
Dorow

[19]

[11] Patent Number: 6,030,046
[45] Date of Patent: Feb. 29, 2000

[54] APPARATUS FOR ANCHORING A CHILD SEAT WITHIN A MOTOR VEHICLE

[75] Inventor: Duane A. Dorow, Rochester Hills, Mich.

[73] Assignee: Chrysler Corporation, Auburn Hills, Mich.

[21] Appl. No.: 09/175,309

[22] Filed: Oct. 20, 1998

[51] Int. Cl.⁷ .................................................. A47C 31/00
[52] U.S. Cl. ................ 297/464; 297/250.1; 297/216.11; 297/253
[58] Field of Search ........................... 297/216.11, 250.1, 297/253, 464

[56] References Cited

U.S. PATENT DOCUMENTS

| | | | |
|---|---|---|---|
| 3,262,736 | 7/1966 | Merelis | 297/253 |
| 3,779,599 | 12/1973 | Gottfried | 297/253 |
| 5,106,158 | 4/1992 | Dukatz et al. | 297/396 |
| 5,466,044 | 11/1995 | Barley et al. | 297/252 |
| 5,472,260 | 12/1995 | Czapski et al. | 297/112 |
| 5,476,305 | 12/1995 | Corkins et al. | 297/238 |
| 5,487,588 | 1/1996 | Burleigh et al. | 297/253 |
| 5,704,684 | 1/1998 | Dukatz et al. | 297/238 |
| 5,720,519 | 2/1998 | Barnes | 297/216.11 |
| 5,918,934 | 7/1999 | Siegrist | 297/216.11 X |

*Primary Examiner*—Peter M. Cuomo
*Assistant Examiner*—Stephen Vu
*Attorney, Agent, or Firm*—James R. Yee

[57] ABSTRACT

An apparatus for anchoring a child seat within a motor vehicle includes an anchorage bar having a pair of child seat connector portions located at the seat bight of a seating unit for a motor vehicle. The seat connection portions are carried by an anchorage bar which is pivotally interconnected to mounting brackets which connect a seat back of the vehicle seat to the floor pan. The anchorage bar is upwardly pivoted.

13 Claims, 5 Drawing Sheets

APPARATUS FOR ANCHORING A CHILD SEAT WITHIN A MOTOR VEHICLE

BACKGROUND OF THE INVENTION

1. Technical Field

The present invention generally pertains to motor vehicles. More particular, the present invention pertains to an apparatus for anchoring a child seat within a motor vehicle. More specifically, but without restriction to the particular embodiment and/or use which is shown and described for purposes of illustration, the present invention relates to an apparatus for anchoring a child seat within a motor vehicle which provides a child seat attachment member adjacent a seat bight portion, the child seat attachment portion adapted to be releasably engaged by a child seat.

2. Discussion

Various types of car seats are known in the art for use when infants or small children are transported by motor vehicle. In general, known car seats are removably secured to a motor vehicle seat by means of a seat belt. In a common application, a webbing of a three point seat belt device is used to secure a child seat to a vehicle seat. A tongue plate of the seat belt device is engaged with a buckle device after a shoulder portion of the seat belt webbing and lap portion of the seat belt webbing are overlapped onto each other and inserted through a portion of the child seat.

In conventionally securing a child seat to a vehicle seat with a seat belt device, the process is complicated. In addition, since all seat belt device are not equipped with a cinching mechanism, withdrawal of the webbing may in certain arrangements only be prevented at the time of rapid deceleration of the vehicle. Thus, there is a possibility that the child seat will move from its fixed position after being secured to the vehicle seat.

SUMMARY OF THE INVENTION

In view of the above, it is a general object of the present invention to provide an improved arrangement for anchoring a child seat within a motor vehicle.

It is another object of the present invention to provide an apparatus for anchoring a child seat within a motor vehicle which is integral with a seat back of a rear folding seat of the motor vehicle.

It is another object of the present invention to provide an apparatus for anchoring a child seat within a motor vehicle which is located at the seat bight of a motor vehicle seat and is adapted to be releasably engage by a child seat.

It is another object of the present invention to provide an apparatus for anchoring a child seat within a motor vehicle which is interconnected to mounting brackets securing a seat assembly to the vehicle floor pan.

In one form, the present invention provides an arrangement for securing a child within a motor vehicle. The motor vehicle has a floor pan and a seating unit having a seat back. The arrangement includes a first mounting bracket and a second mounting bracket. The first mounting bracket is adapted to be fixedly secured to the floor pan and further adapted to be attached to the seat back. The second mounting bracket is adapted to be fixedly secured to the floor pan and further adapted to be attached to the seat back. The arrangement additionally includes a child seat retaining member extending between the first mounting bracket and the second mounting bracket. The child seat retaining member carries a pair of spaced apart child seat engagement portions. The arrangement further includes a child seat including a mounting member releasably engaging the pair of spaced apart child seat engagement portions.

Additional benefits and advantages of the present invention will become apparent to those skilled in the art to which this invention relates from a reading of the subsequent description of the preferred embodiment and the appended claims, taken in conjunction with the accompanying drawings.

DETAILED DESCRIPTION OF THE PREFERRED EMBODIMENT

Figure 1:
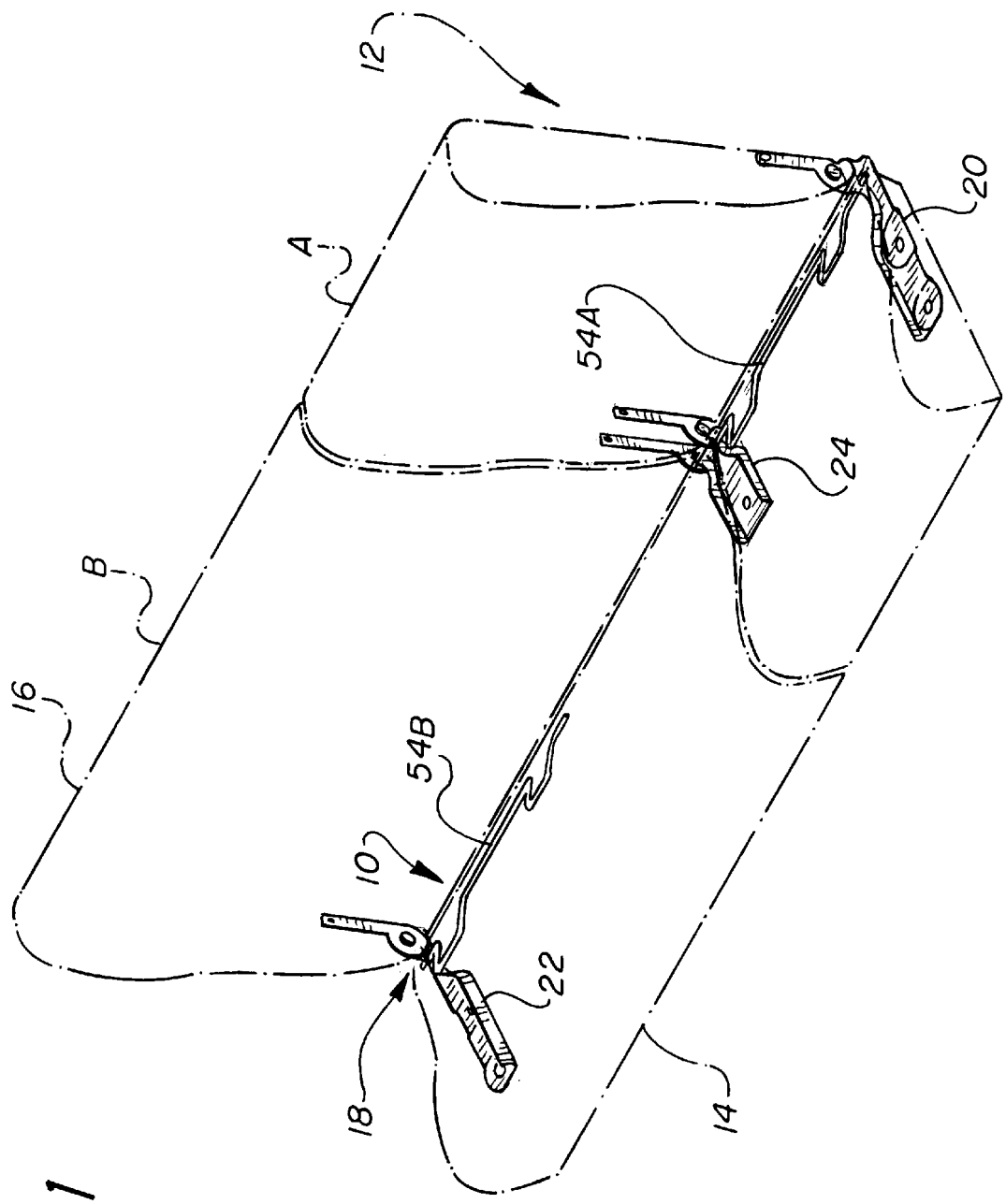
FIG. 1 is a perspective view of a seating arrangement for a motor vehicle incorporating a apparatus for anchoring a child seat constructed in accordance with the teachings of a preferred embodiment of the present invention.
Figure 2:
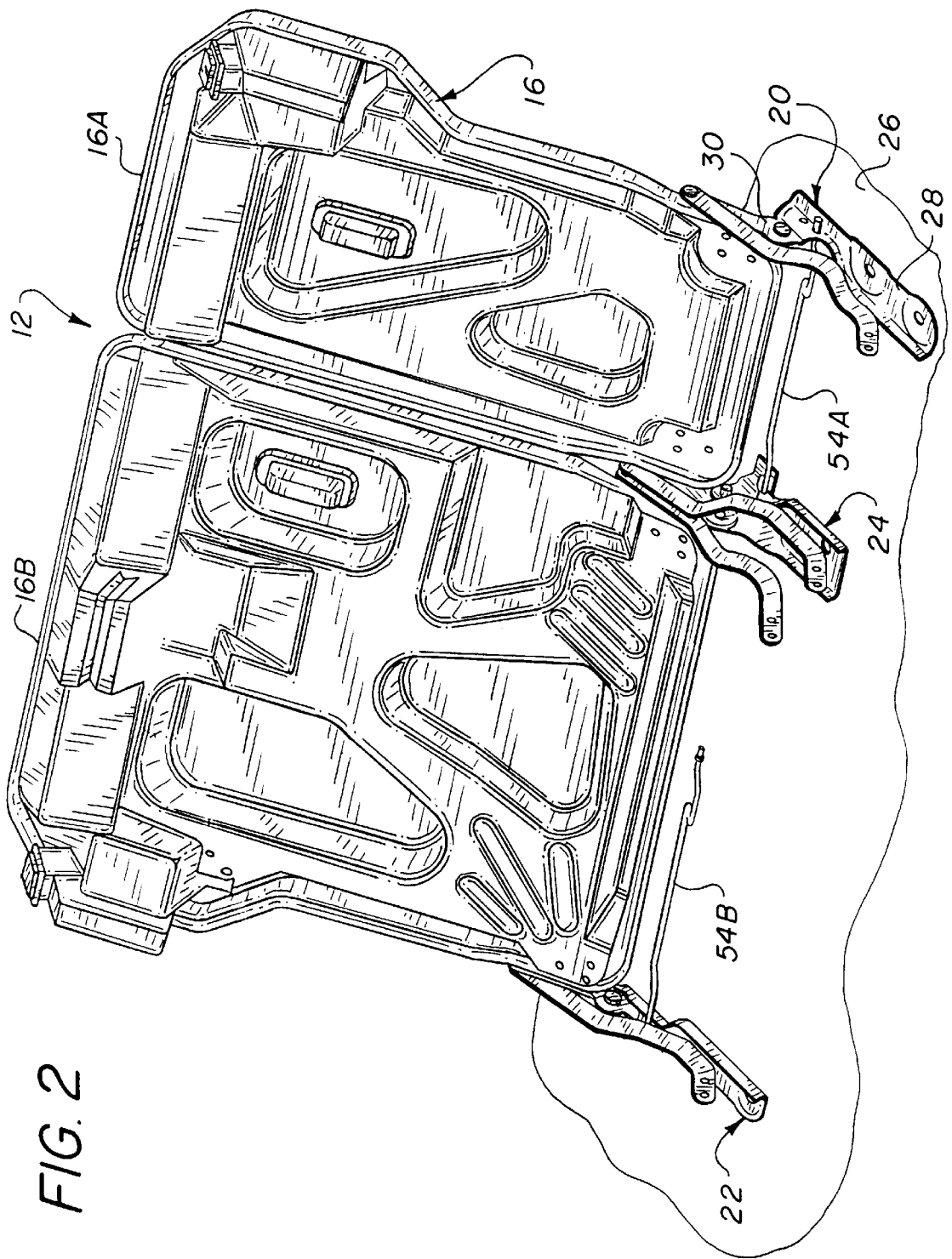
FIG. 2 is a perspective view of the seating arrangement of FIG. 1, shown with portions removed for purposes of illustrating the components of the apparatus of the present invention.
Figure 3:
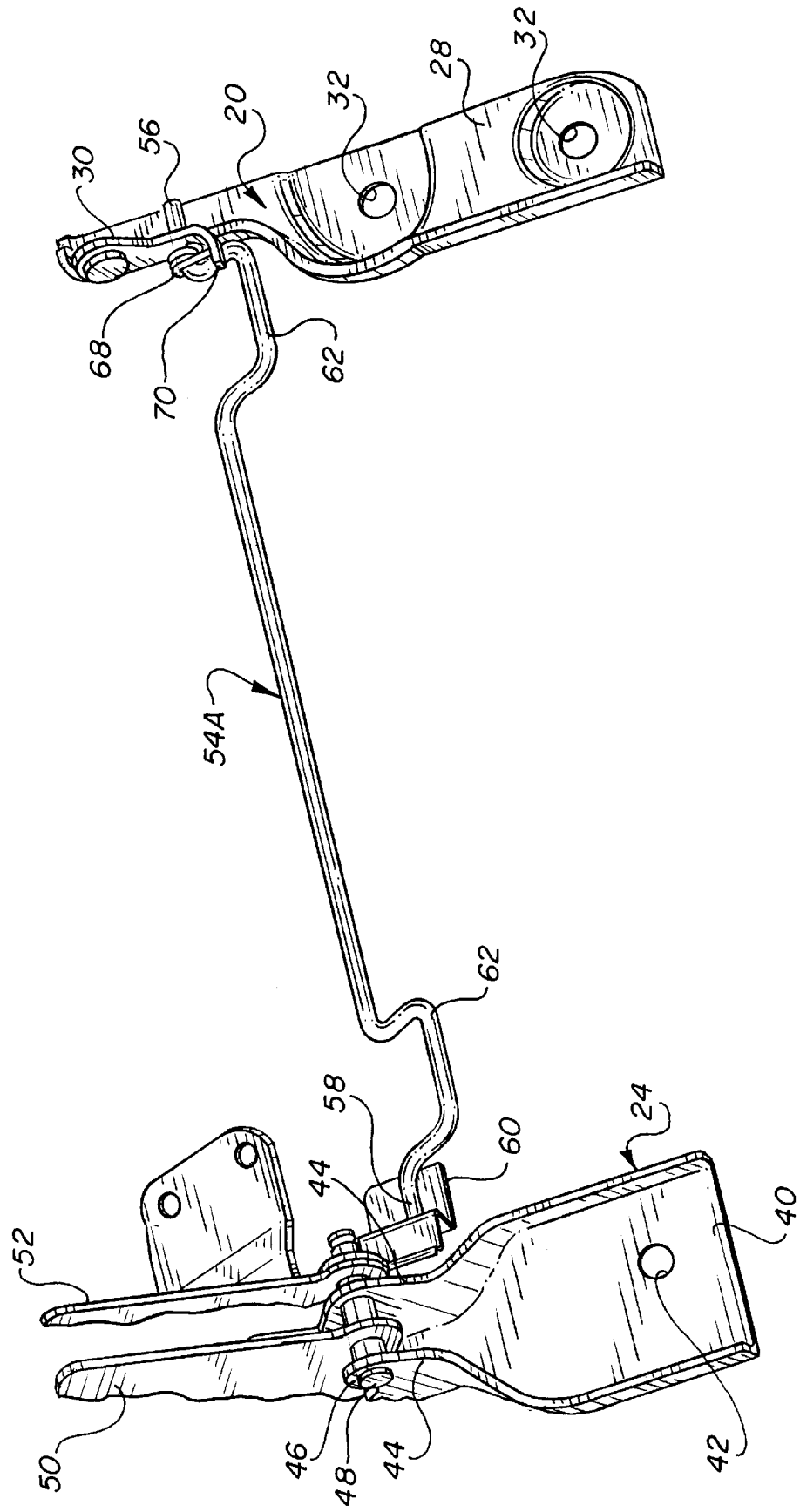
FIG. 3 is an enlarged perspective view of a portion of the apparatus of the present invention.
Figure 4:
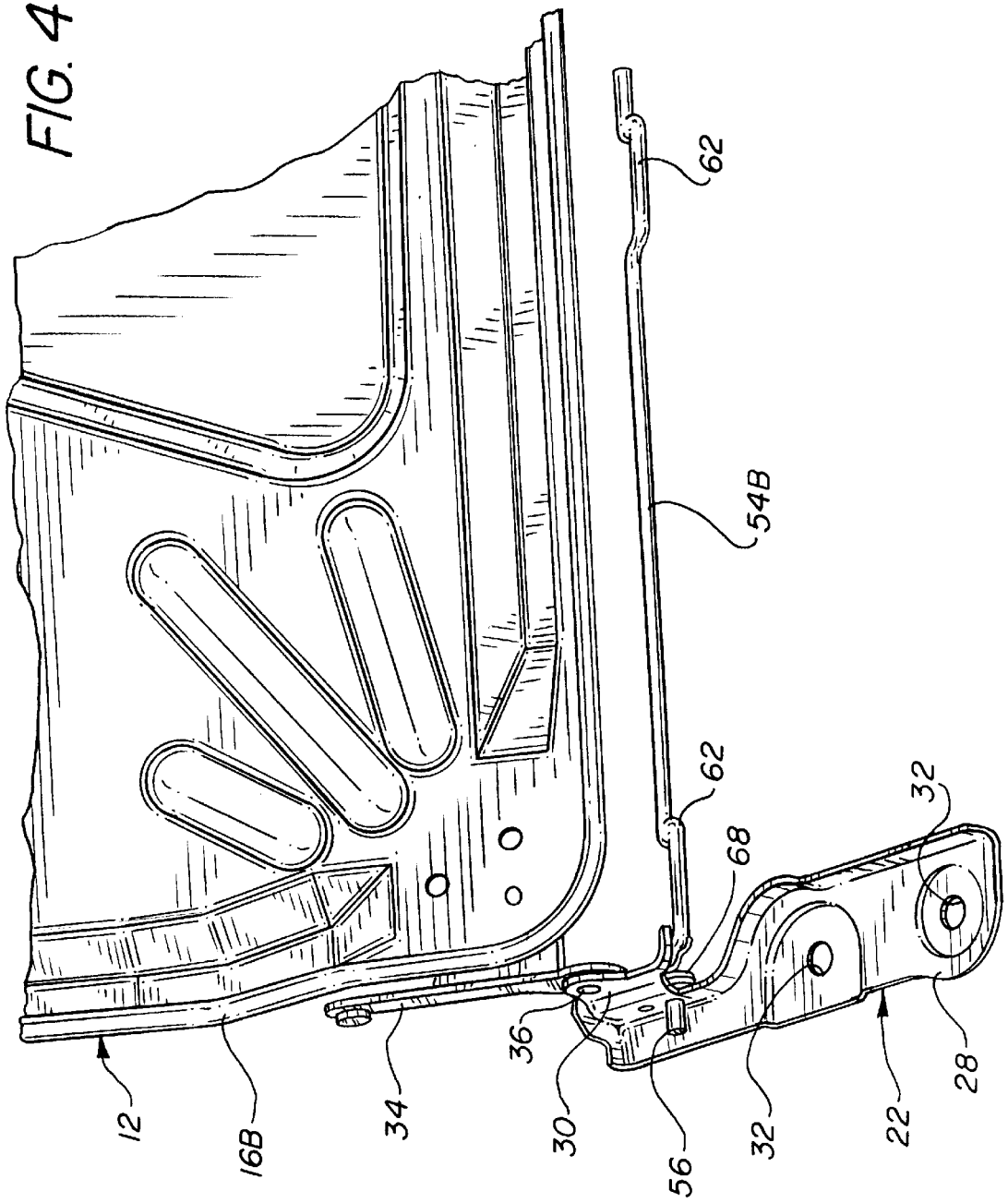
FIG. 4 is another enlarged perspective view of a portion of the apparatus of the present invention.

With initial reference to FIG. 1, an apparatus for anchoring a child seat within a motor vehicle is generally identified with reference numeral 10. The apparatus 10 is shown operatively incorporated into a seating arrangement 12 for a motor vehicle, the remainder of which is otherwise conventional in construction and shown in phantom lines. The apparatus 10 of the present invention is specifically intended to provide a structure to which a universal child seat 8 (shown in FIG. 5) may releasably engage when used in the motor vehicle. As such, specific details of the car seat 8 and the manner in which it releasably engages the apparatus 10 are beyond the scope of the present invention. Criteria for acceptable child seat construction for use with the apparatus 10 of the present invention is set forth in International Safety Standard ISO/22/12/WG1 N436.

Prior to addressing the construction and operation of the apparatus 10 of the present invention, a brief understanding of the remainder of the seating arrangement 12 is warranted. The seating arrangement 12 is illustrated as a rear seating unit which has a lower seat cushion 14 and a seat back 16. In a manner which will be described further below, the seat back 16 is pivotally interconnected to the seat cushion 14 so that it can be folded to a stored position. In the exemplary embodiment shown, the seat arrangement 12 is split into a left hand portion A and a right hand portion B. As illustrated, the seat arrangement 12 is of the split-bench type in which the right hand portion B has a width approximately 60 percent of the entire seat assembly 12. The seating arrangement 12 has a seat bight 18. As used herein the term "seat bight" shall refer to the area close to the intersection of the surfaces of the lower seat cushion 14 and the seat back 16. It will become apparent to those skilled in the art that the teachings of the present invention have applicability to other types of seating arrangements.

With continued reference to FIG. 1 and additional reference to FIGS. 2 through 5, the apparatus 10 of the present invention will be further described. The apparatus 10 is shown to include first and second outboard mounting brackets 20 and 22 and an inboard mounting bracket 24. The first outboard mounting bracket 20 and the inboard mounting bracket 24 cooperate to pivotally interconnect a left hand portion 16A of the seat back 16 to a floor pan 26 of the vehicle. In a similar manner, the second outboard mounting bracket 22 and the inboard mounting bracket 24 cooperate to pivotally interconnect a right hand portion 16B of the seat back 16 to the floor pan 26. It will be understood that the first and second outboard mounting members 20 and 22 are substantially mirror images of one another.

Each of the outboard mounting brackets 20 and 22 is a stamped steel construction formed to include a generally planar lower portion 28 and an upper portion 30. The lower portion 28 is adapted to be secured to the floor pan 26 through fasteners (not shown) which pass through apertures 32 provided therein. Alternatively, the lower portion 28 may be welded or otherwise suitably secured to the floor pan 26. The upper portion 30 is pivotally secured to an arm 34 through a pivot pin 36. The arm 34 is in turn fixedly secured to an adjacent portion of the seat back 16 in a conventional manner.

The inboard mounting bracket 24 similarly includes a generally planar lower portion 40 provided with at least one aperture 42 for receiving a fastener (not shown) for securement to the floor pan 26. The inboard mounting bracket 24 further includes an upper portion having a pair of spaced apart flanges 44. The flanges 44 are provided with aligning apertures 46 which receive a pivot pin 48. A first inboard arm 50 is pivotally carried by the pivot pin 48 and fixedly secured to the right hand portion 16B of the seat back 16 in a conventional manner. Similarly, a second inboard arm 52 is pivotally carried by the pivot pin 48 and is conventionally secured to the left hand portion 16A of the seat back 16.

The apparatus 10 of the present invention is illustrated to further include first and second child seat retaining members or anchorage bars 54A and 54B associated with the left and right hand side portions A and B of the seating arrangement 12. In one application, the anchorage bars 54A and 54B are constructed of round steel stock having a diameter of approximately 6 mm +/−0.1 mm. The first anchorage bar 54A is illustrated to include a first end 56 which passes through an aperture (not specifically shown) provided in the upper portion 30 of the first outboard mounting bracket 20. The first anchorage bar 54A additionally includes a second end 58 which engages an aperture (again not specifically shown) provided in a mounting plate 60 carried by the pivot pin 48. As such, the first anchorage bar 54A is pivotally interconnected to the first outboard mounting bracket 20 and the inboard mounting bracket 24.

Figure 5:
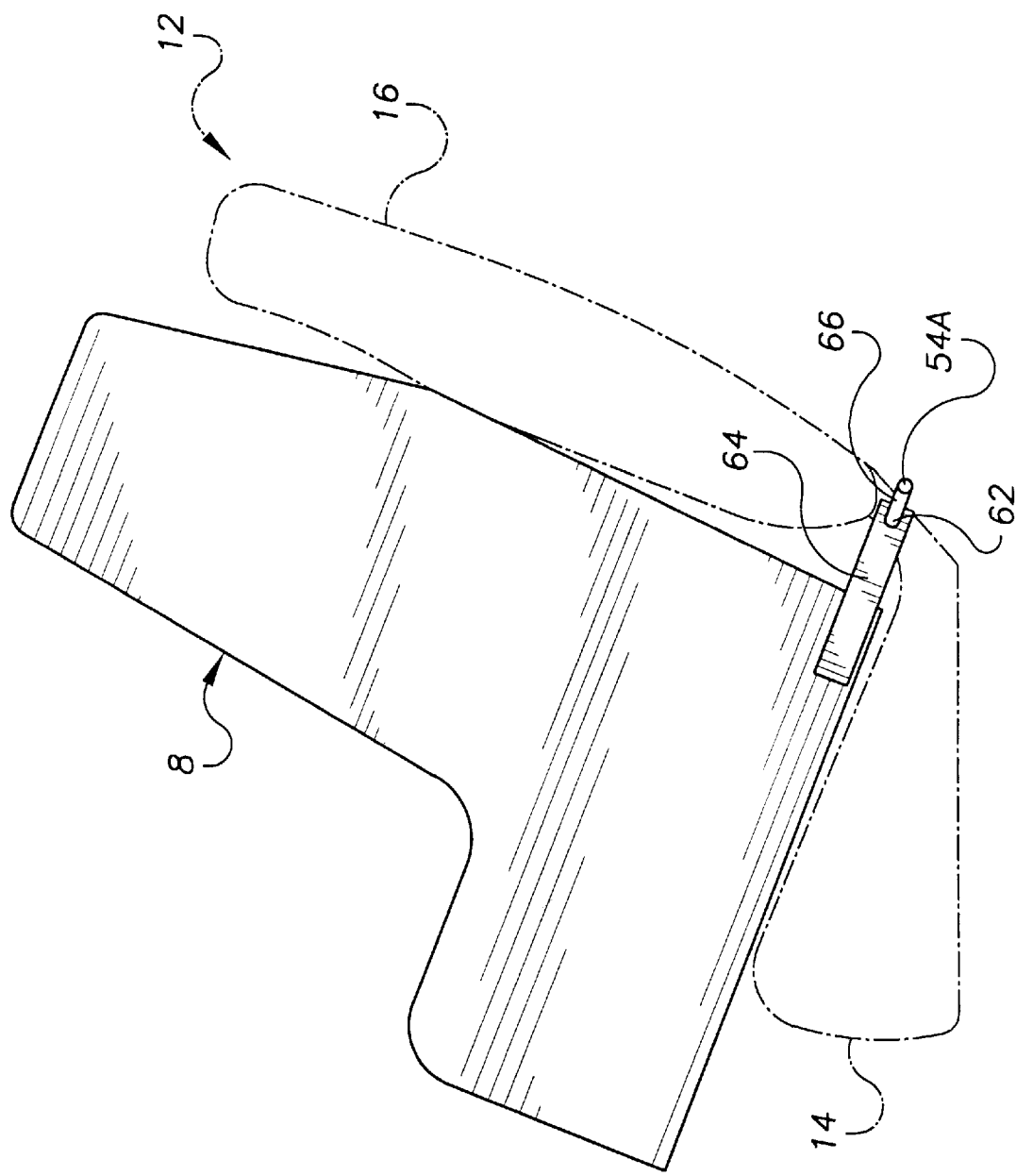
FIG. 5 is a side view of apparatus of the present invention shown in partial section and illustrated operatively associated with an exemplary child seat.

In the exemplary embodiment illustrated, the first anchorage bar 54A is configured to include a pair of child seat engagement portions or connector portions 62. As shown, each of the connector portions 62 has a general U-shape with a central portion which extends in a lateral direction parallel to the remainder of the anchorage bar 54A. As particular shown in FIG. 5, the connection portions 62 are adapted to be releasably received by a latching portion 64 of the child seat 8. Again, as discussed above, the particular construction of the child seat 8 and the latching portion 64 are beyond the scope of the subject invention. However, as shown in FIG. 5, the latching portion 64 is shown to generally define a slot 66 which engages the connection portion 62.

The apparatus 10 of the present invention is further shown to include biasing means for upwardly biasing the first anchorage bar 54A. In the embodiment illustrated, the biasing means comprises an torsion spring 68 which surrounds the anchorage bar 54A adjacent its first end 56. The torsion spring 68 functions to upwardly bias the anchorage bar 54. This upward bias is ultimately opposed by an inwardly extending tang 70 which depends from the upper portion 30 of the first outboard mounting bracket 20. As most clearly shown in FIG. 3, the tang 70 engages the outboard one of the child seat connection portion 62.

The second anchorage bar 54B is largely identical in construction to the first anchorage bar 54A. Additionally, the manner in which the second anchorage bar 54B is pivotally interconnected to the second outboard mounting bracket 22 and the inboard mounting bracket 24 is substantially identical to the manner in which the first anchorage bar 54A is pivotally secured to the first outboard mounting bracket 20 and the inboard mounting bracket 24. For this reason, it is not necessary to detail these features of the present invention. Common reference numerals have been applied in the drawings to identify structurally equivalent portions of the first and second anchorage bars 54A and 54B.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. An arrangement for securing a child within a motor vehicle having a floor pan and a seating unit having a seat back, the arrangement comprising:

a first mounting bracket adapted to be fixedly secured to the floor pan and further adapted to be attached to the seat back;

a second mounting bracket adapted to be fixedly secured to the floor pan and further adapted to be attached to the seat back;

a child seat retaining member extending between said first mounting bracket and said second mounting bracket, said child seat retaining member carrying a pair of spaced apart child seat engagement portions;

a child seat including a mounting member releasably engaging said pair of spaced apart child seat engagement portions; and, means for upwardly biasing said child seat retaining member.

2. The arrangement for securing a child within a motor vehicle of claim 1, wherein said child seat retaining member is pivotally interconnected to said first and second mounting brackets.

3. The arrangement for securing a child within a motor vehicle of claim 2, wherein said child seat retaining member is a cylindrical steel member configured to unitarily include said pair of child seat engagement portions.

4. The arrangement for securing a child within a motor vehicle of claim 1, wherein said means for upwardly biasing said child seat retaining member comprising a torsion spring surrounding one end of said child seat retaining member.

5. The arrangement for securing a child within a motor vehicle of claim 4, wherein one of said inboard mounting bracket and said outboard mounting bracket is configured to oppose a biasing force created by said torsion spring.

6. An arrangement for securing a child within a motor vehicle having a floor pan and a seating unit having a seat back, the arrangement comprising:

a first mounting bracket adapted to be fixedly secured to the floor pan and further adapted to be attached to the seat back;

a second mounting bracket adapted to be fixedly secured to the floor pan and further adapted to be attached to the seat back;

a child seat retaining member extending between said first mounting bracket and said second mounting bracket, said child seat retaining member having a pair of spaced apart child seat engagement portions and a central portion adapted to be oriented laterally with respect to the vehicle, the child seat retaining member being pivotally interconnected to said first and second mounting brackets, wherein each of said child seat engagement portions is generally U-shaped having a middle section oriented parallel to said central portion; and, a child seat including a mounting member releasably engaging said pair of spaced apart child seat engagement portions.

7. In a motor vehicle having a floor pan and a seating unit with a seat back, an arrangement for securing a child within the motor vehicle, the arrangement comprising:

a first mounting bracket fixedly secured to the floor pan and attached to the seat back;

a second mounting bracket fixedly secured to the floor pan and attached to the seat back;

a child seat retaining member extending between said first mounting bracket and said second mounting bracket, said child seat retaining member carrying a pair of spaced apart child seat engagement portions;

a child seat including a mounting member releasably engaging said pair of spaced apart child seat engagement portions; and, means for upwardly biasing said child seat retaining member.

8. The arrangement for securing a child within a motor vehicle of claim 7, wherein said child seat retaining member is pivotally interconnected to said first and second mounting brackets.

9. The arrangement for securing a child within a motor vehicle of claim 8, wherein said child seat retaining member is a cylindrical steel member configured to unitarily include said pair of child seat engagement portions.

10. The arrangement for securing a child within a motor vehicle of claim 7, wherein said means for upwardly biasing said child seat retaining member comprises a torsion spring surrounding one end of said child seat retaining member.

11. The arrangement for securing a child within a motor vehicle of claim 10, wherein one of said inboard mounting bracket and said outboard mounting bracket is configured to oppose a biasing force created by said torsion spring.

12. In a motor vehicle having a floor pan and a seating unit with a seat back, an arrangement for securing a child within a motor vehicle, the arrangement comprising:

a first mounting bracket fixedly secured to the floor pan and attached to the seat back;

a second mounting bracket fixedly secured to the floor pan and attached to the seat back;

a child seat retaining member extending between said first mounting bracket and said second mounting bracket, wherein said child seat retaining member includes a pair of spaced apart child seat engagement portions and a central portion adapted to be oriented laterally with respect to the vehicle and further wherein each of said seat engagement portions is generally U-shaped having a middle section oriented parallel to said central portion; and, a child seat including a mounting member releasably engaging said pair of spaced apart child seat engagement portions.

13. In a motor vehicle having a floor pan and a seating unit with a seat back, the seat back having a right hand portion and a left hand portion, an apparatus for securing a child within the motor vehicle, the apparatus comprising:

a first outboard mounting bracket fixedly connected to the floor pan and pivotally interconnected to an outboard side of the left hand portion of the seat back;

a second outboard mounting bracket fixedly connected to the floor pan and pivotally interconnected to an outboard side of the right hand portion of the seat back;

an inboard mounting bracket fixedly connected to the floor pan and independently pivotally interconnected to an inboard side of the right hand portion of the seat back and an inboard side of the left hand portion of the seat back;

a first child seat mounting member pivotally interconnected to said first outboard mounting bracket and said inboard mounting bracket, said first child seat retaining member carrying a first pair of spaced apart child seat engagement portions;

a second child seat retaining member pivotally interconnected to said second outboard mounting bracket and said inboard mounting bracket, said second child seat retaining member including a second pair of child seat engagement portions; and a child seat releasably engaging one of said first and second pairs of child seat engagement portions.

* * * * *